(12) United States Patent
Witkowski et al.

(10) Patent No.: US 9,638,337 B2
(45) Date of Patent: *May 2, 2017

(54) PLUG VALVE HAVING PRELOADED SEAL SEGMENTS

(71) Applicant: S.P.M. Flow Control, Inc., Fort Worth, TX (US)

(72) Inventors: Brian Witkowski, Weatherford, TX (US); Nuder Said, Fort Worth, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/820,905

(22) Filed: Aug. 7, 2015

(65) Prior Publication Data

US 2015/0345646 A1    Dec. 3, 2015

Related U.S. Application Data

(63) Continuation of application No. 13/965,848, filed on Aug. 13, 2013, now Pat. No. 9,103,448.
(Continued)

(51) Int. Cl.
*F16K 5/04* (2006.01)
*B23P 15/00* (2006.01)

(52) U.S. Cl.
CPC .......... *F16K 5/0457* (2013.01); *B23P 15/001* (2013.01); *F16K 5/0471* (2013.01); *Y10T 29/4941* (2015.01); *Y10T 29/49409* (2015.01)

(58) Field of Classification Search
CPC ...... F16K 5/0471; F16K 5/0407; F16K 5/045; F16K 5/18; F16K 5/184; F16K 5/0457;
(Continued)

(56) References Cited

U.S. PATENT DOCUMENTS 345,420 A    7/1886    Eskholme et al.
375,464 A    12/1887   Thacher et al.
(Continued)

FOREIGN PATENT DOCUMENTS

AU    1320088 A    9/1988
AU    649744 B2    6/1994
(Continued)

OTHER PUBLICATIONS

BJ 285959—3 Inch 15,000 PSi Popoff Valve, Mar. 26, 2004 (1 page).
(Continued)

*Primary Examiner* — Michael R Reid
(74) *Attorney, Agent, or Firm* — Gardere Wynne Sewell LLP

(57) ABSTRACT

A plug valve including a valve body having an inlet port, an outlet port and a central chamber extending between the inlet port and the outlet port. The valve also includes an inlet seal segment within the central chamber and includes a bore extending therethrough and aligned with the inlet port. An outlet seal segment is disposed within the central chamber having a bore extending therethrough and aligned with the outlet port. A plug member is disposed in the central chamber and is moveable between an open position, to facilitate fluid flow through the plug valve, and a closed position, to block fluid flow through the plug valve. First and second side segments are disposed between and interlocked to the inlet and outlet seal segments to encircle the plug member. The side segments are tensioned to preload the seal segments against the plug member to prevent the flow of fluid between the seal segments and the plug member.

23 Claims, 4 Drawing Sheets

Related U.S. Application Data

(60) Provisional application No. 61/684,008, filed on Aug. 16, 2012.

(58) Field of Classification Search
CPC .......... Y10T 29/49409; Y10T 29/4941; B23P 15/001
USPC .......... 251/208, 209, 309; 137/15.24, 315.25
See application file for complete search history.

(56) References Cited

U.S. PATENT DOCUMENTS

| | | |
|---|---|---|
| 580,226 A | 4/1897 | Sanford |
| 741,477 A | 10/1903 | Flinn |
| 1,201,022 A | 10/1916 | Conniff |
| 1,379,092 A | 5/1921 | Fraccascia |
| 1,452,603 A | 4/1923 | Himes |
| 1,473,634 A | 11/1923 | Loudon |
| 1,483,001 A | 2/1924 | Kurre |
| 1,488,211 A | 3/1924 | Loeffler |
| 1,543,637 A | 6/1925 | Woll |
| 1,607,463 A | 11/1926 | Kent |
| 1,664,493 A | 4/1928 | Smith |
| 1,675,808 A | 7/1928 | Kliss |
| 1,764,936 A | 6/1930 | Dean |
| 1,798,498 A | 3/1931 | Riley |
| D86,952 S | 5/1932 | Garrison et al. |
| 1,889,256 A | 11/1932 | Lipscomb |
| 1,990,090 A | 2/1935 | Packard |
| 2,197,320 A | 4/1940 | Shenton |
| 2,310,583 A | 2/1943 | Johnson |
| 2,310,813 A | 2/1943 | Sellmeyer |
| 2,339,287 A | 1/1944 | Neef, Jr. |
| 2,354,161 A | 7/1944 | Waterman |
| 2,361,881 A | 10/1944 | Sheppard |
| 2,391,266 A | 12/1945 | Parker |
| 2,404,142 A | 7/1946 | Parker |
| D150,466 S | 8/1948 | Schuler |
| 2,506,162 A | 5/1950 | Metzgar |
| 2,576,431 A | 11/1951 | White |
| 2,587,212 A | 2/1952 | Placette |
| 2,589,144 A | 3/1952 | Russell et al. |
| 2,606,068 A | 8/1952 | Bonacor |
| 2,612,340 A | 9/1952 | Laurent |
| 2,663,458 A | 12/1953 | Macglashan |
| 2,694,503 A | 11/1954 | Young |
| 2,717,001 A | 9/1955 | Perrault |
| 2,746,773 A | 5/1956 | Bily |
| 2,766,999 A | 10/1956 | Watts |
| 2,795,459 A | 6/1957 | Cornelius |
| 2,923,317 A | 2/1960 | McInerney |
| 2,925,827 A | 2/1960 | Anderson et al. |
| 2,969,492 A | 1/1961 | Wheatley et al. |
| 3,024,047 A | 3/1962 | Schmohl |
| 3,060,961 A | 10/1962 | Conley |
| 3,061,267 A | 10/1962 | Hamer et al. |
| 3,064,940 A | 11/1962 | Anderson |
| 3,072,379 A | 1/1963 | Hamer |
| 3,108,939 A | 10/1963 | Sabins et al. |
| 3,113,792 A | 12/1963 | Brown |
| 3,150,681 A | 9/1964 | Hansen |
| 3,160,426 A | 12/1964 | Faeser |
| 3,194,589 A | 7/1965 | Kahlbau et al. |
| 3,204,484 A | 9/1965 | Gustafson et al. |
| 3,216,746 A | 11/1965 | Watts |
| 3,228,334 A | 1/1966 | Oss |
| 3,238,687 A | 3/1966 | Tisbo |
| 3,241,567 A | 3/1966 | Pusch |
| 3,294,425 A | 12/1966 | Franck |
| 3,341,232 A | 9/1967 | Deakins |
| 3,343,802 A | 9/1967 | Schuilwerve |
| 3,346,002 A | 10/1967 | Thompson, Jr. et al. |
| 3,357,679 A | 12/1967 | Gulick |
| 3,403,931 A | 10/1968 | Crain |
| 3,404,698 A | 10/1968 | Dorch |
| 3,425,661 A | 2/1969 | Mayo |
| 3,439,897 A | 4/1969 | Priese |
| 3,455,534 A | 7/1969 | Scaramucci |
| 3,467,224 A | 9/1969 | Curtis |
| 3,472,479 A | 10/1969 | Sherwood |
| 3,554,581 A | 1/1971 | Mason |
| 3,556,474 A | 1/1971 | Domer Scaramucci |
| 3,561,727 A | 2/1971 | Scaramucci |
| 3,571,896 A | 3/1971 | Wilkerson |
| 3,594,835 A | 7/1971 | Wilson |
| 3,630,483 A | 12/1971 | Canalizo |
| 3,680,188 A | 8/1972 | Mason et al. |
| 3,687,415 A | 8/1972 | Turkot |
| 3,712,585 A | 1/1973 | Grenier |
| 3,726,314 A | 4/1973 | Moen |
| 3,789,872 A | 2/1974 | Elliott |
| 3,813,733 A | 6/1974 | Flohr |
| 3,830,306 A | 8/1974 | Brown |
| 3,840,048 A | 10/1974 | Moen |
| 3,845,876 A | 11/1974 | Needham et al. |
| 3,845,879 A | 11/1974 | Dernbach et al. |
| 3,881,480 A | 5/1975 | LaFourcade |
| 3,894,718 A | 7/1975 | Koch et al. |
| 3,901,259 A | 8/1975 | Banbury |
| 3,916,950 A | 11/1975 | Mongerson et al. |
| 3,933,172 A | 1/1976 | Allen |
| 3,934,608 A | 1/1976 | Guyton |
| 3,937,240 A | 2/1976 | Nanny |
| 3,942,551 A | 3/1976 | Schuller et al. |
| 3,967,842 A | 7/1976 | Kendrick |
| 3,972,364 A | 8/1976 | Brumm |
| 3,974,848 A | 8/1976 | Wheatley |
| 4,022,427 A | 5/1977 | Read |
| 4,027,696 A | 6/1977 | Guyton |
| 4,046,164 A | 9/1977 | Pool |
| 4,059,872 A | 11/1977 | Delesandri |
| 4,085,770 A | 4/1978 | Woronowicz |
| 4,086,803 A | 5/1978 | Wheeler |
| 4,093,180 A | 6/1978 | Strabala |
| 4,109,714 A | 8/1978 | Greenlee et al. |
| 4,113,228 A | 9/1978 | Frye |
| 4,146,047 A | 3/1979 | Wood et al. |
| 4,150,847 A | 4/1979 | De Cenzo |
| 4,171,095 A | 10/1979 | Filan et al. |
| 4,218,080 A | 8/1980 | Kendrick |
| 4,221,204 A | 9/1980 | Meyer |
| 4,254,793 A | 3/1981 | Scaramucci |
| 4,261,387 A | 4/1981 | Cohn |
| 4,274,434 A | 6/1981 | Hafele |
| 4,286,621 A | 9/1981 | Glahn |
| 4,308,916 A | 1/1982 | Fritz, Jr. |
| 4,321,945 A | 3/1982 | Chabat-Courrede |
| 4,327,768 A | 5/1982 | Behle |
| 4,332,370 A | 6/1982 | Williams |
| 4,338,707 A | 7/1982 | Byerly |
| 4,367,571 A | 1/1983 | Speirs et al. |
| 4,378,849 A | 4/1983 | Wilks |
| 4,399,830 A | 8/1983 | Brodie |
| 4,445,255 A | 5/1984 | Olejak |
| 4,448,148 A | 5/1984 | Gain, Jr. |
| 4,478,388 A | 10/1984 | George |
| 4,485,530 A | 12/1984 | Begley et al. |
| 4,485,843 A | 12/1984 | Wolff |
| 4,497,344 A | 2/1985 | Kisiel |
| 4,501,291 A | 2/1985 | Siegrist |
| 4,506,696 A | 3/1985 | Von Pechmann |
| 4,511,120 A | 4/1985 | Conley et al. |
| 4,524,599 A | 6/1985 | Bailey |
| 4,531,542 A | 7/1985 | Looney |
| 4,572,237 A | 2/1986 | Thompson |
| 4,590,957 A | 5/1986 | McFarlane |
| 4,597,505 A | 7/1986 | Mozley et al. |
| 4,605,036 A | 8/1986 | Smith et al. |
| 4,616,803 A | 10/1986 | Schils |
| 4,662,603 A | 5/1987 | Etheridge |
| 4,667,570 A | 5/1987 | Jensen, Jr. et al. |
| 4,705,306 A | 11/1987 | Guido et al. |
| 4,716,930 A | 1/1988 | Richmond et al. |
| 4,732,215 A | 3/1988 | Hopper |

(56) References Cited

U.S. PATENT DOCUMENTS

| | | |
|---|---|---|
| 4,836,240 A | 6/1989 | Elliott |
| 4,842,014 A | 6/1989 | Strelow et al. |
| 4,848,398 A | 7/1989 | Leach |
| 4,850,392 A | 7/1989 | Crump et al. |
| 4,864,696 A | 9/1989 | Mittermaier et al. |
| 4,896,367 A | 1/1990 | Newton et al. |
| 4,915,418 A | 4/1990 | Palatchy |
| 4,969,482 A | 11/1990 | Perrin et al. |
| 4,993,489 A | 2/1991 | McLeod |
| 5,025,865 A | 6/1991 | Caldwell et al. |
| 5,046,525 A | 9/1991 | Powell |
| 5,056,548 A | 10/1991 | Mills |
| 5,143,112 A | 9/1992 | Scaramucci |
| 5,161,566 A | 11/1992 | Scaramucci |
| 5,161,570 A | 11/1992 | Scaramucci |
| 5,165,478 A | 11/1992 | Wilson |
| 5,178,185 A | 1/1993 | Stehling et al. |
| 5,199,464 A | 4/1993 | Savard |
| 5,307,835 A | 5/1994 | Scaramucci |
| 5,341,840 A | 8/1994 | Manson et al. |
| 5,386,847 A | 2/1995 | Scaramucci |
| 5,417,402 A | 5/1995 | Speybroeck |
| D360,728 S | 7/1995 | Nozaki |
| 5,439,027 A | 8/1995 | Layton et al. |
| 5,441,072 A | 8/1995 | Indey et al. |
| 5,443,088 A | 8/1995 | Hoch et al. |
| 5,462,413 A | 10/1995 | Schroeder |
| 5,477,752 A | 12/1995 | West et al. |
| 5,507,533 A | 4/1996 | Mumma |
| 5,522,420 A | 6/1996 | Martin |
| 5,526,883 A | 6/1996 | Breaux |
| 5,538,296 A | 7/1996 | Horton |
| 5,544,675 A | 8/1996 | Dean |
| 5,584,315 A | 12/1996 | Powell |
| 5,603,485 A | 2/1997 | Schwarz |
| 5,676,348 A | 10/1997 | Ungchusri et al. |
| 5,685,334 A | 11/1997 | Hagan |
| 5,689,862 A | 11/1997 | Hayes et al. |
| 5,755,427 A | 5/1998 | Koskinas |
| 5,787,926 A | 8/1998 | Mukumoto et al. |
| 5,791,693 A | 8/1998 | Crawford |
| 5,832,947 A | 11/1998 | Niemczyk |
| 5,947,152 A | 9/1999 | Martin et al. |
| 5,957,592 A | 9/1999 | Yamanaka |
| 5,971,007 A | 10/1999 | Harcourt et al. |
| 5,983,826 A | 11/1999 | Lohde |
| 6,003,837 A | 12/1999 | Raymond, Jr. et al. |
| 6,029,693 A | 2/2000 | Nakanishi et al. |
| 6,079,439 A | 6/2000 | Hartley |
| 6,082,707 A | 7/2000 | Hosie et al. |
| 6,085,572 A | 7/2000 | McGuire, Sr. et al. |
| 6,089,531 A | 7/2000 | Young |
| 6,155,091 A | 12/2000 | Hayes et al. |
| 6,164,707 A | 12/2000 | Ungchusri et al. |
| 6,209,561 B1 | 4/2001 | Kugelev et al. |
| 6,230,733 B1 | 5/2001 | Strelow et al. |
| 6,240,951 B1 | 6/2001 | Yori |
| 6,250,605 B1 | 6/2001 | Young |
| 6,290,237 B1 | 9/2001 | Graupner |
| 6,361,051 B1 | 3/2002 | Babin |
| 6,371,527 B1 | 4/2002 | Ungchusri et al. |
| 6,382,247 B1 | 5/2002 | Gundry |
| 6,387,226 B1 | 5/2002 | Persson |
| 6,450,477 B1 | 9/2002 | Young |
| 6,554,024 B2 | 4/2003 | Mefford et al. |
| 6,554,249 B2 | 4/2003 | Pang et al. |
| 6,742,538 B1 | 6/2004 | Aderholt et al. |
| 6,752,377 B1 | 6/2004 | Taylor et al. |
| 6,770,177 B2 | 8/2004 | Keller et al. |
| 6,843,265 B2 | 1/2005 | Taylor |
| 6,854,704 B1 | 2/2005 | Young |
| 6,880,567 B2 | 4/2005 | Klaver et al. |
| 6,880,568 B1 | 4/2005 | Taylor |
| 6,886,593 B2 | 5/2005 | Madden et al. |
| 6,945,569 B1 | 9/2005 | Diaz et al. |
| 6,948,526 B2 | 9/2005 | Seder et al. |
| 6,978,799 B2 | 12/2005 | Kugelev et al. |
| 7,004,445 B2 | 2/2006 | Lymberopoulos |
| 7,028,778 B2 | 4/2006 | Krywitsky |
| 7,028,986 B2 | 4/2006 | Young |
| 7,204,525 B2 | 4/2007 | Matzner |
| RE39,695 E | 6/2007 | Ungchusri et al. |
| 7,228,869 B2 | 6/2007 | Wilhelm |
| D549,850 S | 8/2007 | Perlman |
| 7,264,059 B2 | 9/2007 | Akselberg |
| 7,285,190 B2 | 10/2007 | Martin, Jr. |
| 7,302,961 B2 | 12/2007 | Martin et al. |
| D570,501 S | 6/2008 | Janesz et al. |
| 7,398,796 B2 | 7/2008 | Hjorth et al. |
| 7,401,819 B2 | 7/2008 | Gibb et al. |
| 7,451,959 B2 | 11/2008 | Matzner |
| 7,458,212 B2 | 12/2008 | Koizumi et al. |
| 7,516,941 B2 | 4/2009 | Combs |
| 7,549,681 B1 | 6/2009 | Matzner |
| 7,677,526 B2 | 3/2010 | Lymberopoulos |
| 7,819,386 B2 | 10/2010 | Combs |
| 7,823,265 B2 | 11/2010 | Matzner et al. |
| 7,890,276 B2 | 2/2011 | Killion et al. |
| 7,950,409 B2 | 5/2011 | Stokes et al. |
| 8,000,909 B2 | 8/2011 | Danzy |
| 8,051,875 B2 | 11/2011 | Edwards |
| D660,461 S | 5/2012 | Kotin |
| D660,984 S | 5/2012 | Kotin et al. |
| 8,196,229 B1 | 6/2012 | Hickok |
| D666,326 S | 8/2012 | Sims |
| 8,261,771 B2 | 9/2012 | Witkowski et al. |
| D675,750 S | 2/2013 | King |
| 8,376,046 B2 | 2/2013 | Broussard, II |
| 8,465,001 B2 | 6/2013 | Witkowski et al. |
| 8,469,108 B2 | 6/2013 | Kajaria et al. |
| 8,474,521 B2 | 7/2013 | Kajaria et al. |
| 8,490,949 B2 | 7/2013 | Lanning et al. |
| D703,294 S | 4/2014 | Witkowski et al. |
| 8,695,627 B2 | 4/2014 | Kugelev et al. |
| D707,332 S | 6/2014 | Witkowski et al. |
| D707,797 S | 6/2014 | Wilkowski et al. |
| 8,870,233 B2 | 10/2014 | Matzner et al. |
| 8,978,695 B2 | 3/2015 | Witkowski et al. |
| 8,998,168 B2 | 4/2015 | Witkowski et al. |
| D734,434 S | 7/2015 | Witkowski et al. |
| 9,103,448 B2 | 8/2015 | Witkowski et al. |
| 2002/0179876 A1 | 12/2002 | Pang et al. |
| 2002/0185867 A1 | 12/2002 | Stachowiak |
| 2002/0186910 A1 | 12/2002 | Maret |
| 2003/0047944 A1 | 3/2003 | Ungchusri et al. |
| 2003/0178067 A1 | 9/2003 | Fredrickson et al. |
| 2004/0163716 A1 | 8/2004 | Madden et al. |
| 2005/0087232 A1 | 4/2005 | Kugelev et al. |
| 2005/0121073 A1 | 6/2005 | Carroll |
| 2005/0199286 A1 | 9/2005 | Appleford et al. |
| 2006/0091339 A1 | 5/2006 | Young |
| 2006/0185731 A1 | 8/2006 | Grable et al. |
| 2006/0266422 A1 | 11/2006 | Feenstra et al. |
| 2006/0278394 A1 | 12/2006 | Stover |
| 2006/0283513 A1 | 12/2006 | Kurian et al. |
| 2007/0029090 A1 | 2/2007 | Andreychuk et al. |
| 2007/0051411 A1 | 3/2007 | Scaramucci et al. |
| 2007/0205387 A1 | 9/2007 | Grau et al. |
| 2007/0262029 A1 | 11/2007 | Yoshida et al. |
| 2007/0272308 A1 | 11/2007 | Spears et al. |
| 2008/0039802 A1 | 2/2008 | Vangsness et al. |
| 2008/0054204 A1 | 3/2008 | Zhou |
| 2008/0142752 A1 | 6/2008 | Matzner |
| 2008/0196773 A1 | 8/2008 | Franconi |
| 2008/0264649 A1 | 10/2008 | Crawford |
| 2008/0295910 A1 | 12/2008 | Aleksandersen et al. |
| 2008/0308159 A1 | 12/2008 | Stunkard |
| 2009/0008934 A1 | 1/2009 | Matzner et al. |
| 2009/0120635 A1 | 5/2009 | Neal |
| 2010/0154894 A1 | 6/2010 | Kotapish et al. |
| 2010/0193057 A1 | 8/2010 | Garner et al. |
| 2010/0258200 A1 | 10/2010 | Walker et al. |
| 2010/0288493 A1 | 11/2010 | Fielder et al. |
| 2010/0326541 A1 | 12/2010 | Kugelev et al. |

(56) References Cited

U.S. PATENT DOCUMENTS

| | | |
|---|---|---|
| 2011/0036415 A1 | 2/2011 | Lymberopoulos |
| 2011/0061871 A1 | 3/2011 | Omvik |
| 2011/0240126 A1 | 10/2011 | Lymberopoulos et al. |
| 2011/0272158 A1 | 11/2011 | Neal |
| 2011/0316274 A1 | 12/2011 | Gronlund et al. |
| 2012/0025114 A1 | 2/2012 | Lymberopoulos et al. |
| 2012/0031494 A1 | 2/2012 | Lymberopoulos |
| 2012/0060929 A1 | 3/2012 | Kendrick |
| 2012/0073670 A1 | 3/2012 | Lymberopoulos |
| 2012/0085541 A1 | 4/2012 | Love et al. |
| 2012/0091743 A1 | 4/2012 | Ohman, III et al. |
| 2012/0181013 A1 | 7/2012 | Kajaria et al. |
| 2012/0181015 A1 | 7/2012 | Kajaria et al. |
| 2012/0181016 A1 | 7/2012 | Kajaria et al. |
| 2012/0219354 A1 | 8/2012 | Bauer et al. |
| 2012/0227983 A1 | 9/2012 | Lymberopoulos et al. |
| 2012/0255734 A1 | 10/2012 | Coli et al. |
| 2012/0298213 A1 | 11/2012 | Forster et al. |
| 2012/0325332 A1 | 12/2012 | Ball et al. |
| 2013/0000745 A1 | 1/2013 | Witkowski et al. |
| 2013/0020519 A1 | 1/2013 | Lymberopoulos |
| 2013/0037125 A1 | 2/2013 | Drake et al. |
| 2013/0126152 A1 | 5/2013 | Banks et al. |
| 2013/0248182 A1 | 9/2013 | Chong et al. |
| 2013/0299727 A1 | 11/2013 | Witkowski et al. |
| 2014/0048158 A1 | 2/2014 | Baca et al. |
| 2014/0048255 A1 | 2/2014 | Baca et al. |
| 2015/0000766 A1 | 1/2015 | Arizpe et al. |
| 2015/0042088 A1 | 2/2015 | Witkowski et al. |

FOREIGN PATENT DOCUMENTS

| | | |
|---|---|---|
| AU | 348253 | 5/2013 |
| CA | 2350047 A1 | 12/2001 |
| CA | 2635751 A1 | 12/2001 |
| CA | 2485817 A1 | 4/2005 |
| CA | 2490664 A1 | 10/2005 |
| CA | 2503231 A1 | 10/2005 |
| CA | 2612397 A1 | 6/2008 |
| CA | 2636751 A1 | 1/2009 |
| CA | 2654848 A1 | 8/2010 |
| CA | 149748 S | 11/2014 |
| CA | 152956 S | 11/2014 |
| CA | 152957 S | 11/2014 |
| CA | 2764310 | 6/2015 |
| CN | 2118877 U | 10/1992 |
| CN | 1137309 A | 12/1996 |
| CN | 1225298 A | 8/1999 |
| CN | 2426550 Y | 4/2001 |
| CN | 1548701 A | 11/2004 |
| CN | 2901281 Y | 5/2007 |
| CN | 200999609 Y | 1/2008 |
| CN | 201043685 Y | 4/2008 |
| CN | 101205798 A | 6/2008 |
| CN | 101258350 A | 9/2008 |
| CN | 101303033 A | 11/2008 |
| CN | 101367099 A | 2/2009 |
| CN | 201206648 Y | 3/2009 |
| CN | 201262043 Y | 6/2009 |
| CN | 101539218 A | 9/2009 |
| CN | 101722221 A | 6/2010 |
| CN | 201496006 U | 6/2010 |
| CN | 201545914 U | 8/2010 |
| CN | 201650157 U | 11/2010 |
| CN | 201739525 U | 2/2011 |
| CN | 201747313 U | 2/2011 |
| CN | 202047762 U | 11/2011 |
| CN | 102323158 A | 1/2012 |
| CN | 202144943 U | 2/2012 |
| CN | 202208237 U | 5/2012 |
| CN | 202255397 U | 5/2012 |
| CN | 202255848 U | 5/2012 |
| CN | 202718658 U | 2/2013 |
| CN | ZL2013300399164 | 9/2013 |
| CN | ZL201330441389.X | 4/2014 |
| CN | ZL201080025350.3 | 5/2014 |
| CN | ZL201330441241.6 | 5/2014 |
| DE | 1166571 B | 3/1964 |
| DE | 2415732 A1 | 10/1974 |
| DE | 2358756 A1 | 3/1975 |
| DE | 2558272 A1 | 7/1977 |
| DE | 2642743 A1 | 3/1978 |
| DE | 218416 A1 | 2/1985 |
| DE | 3341643 A1 | 5/1985 |
| DE | 19707228 A1 | 8/1998 |
| DE | 102004033453 A1 | 1/2006 |
| EA | 201171356 A1 | 5/2012 |
| EM | 002185371-0001 | 2/2013 |
| EM | 002307421-0001 | 9/2013 |
| EM | 002307421-0002 | 9/2013 |
| EP | 44619 A1 | 1/1982 |
| EP | 0559131 A1 | 9/1993 |
| EP | 1219942 A1 | 7/2002 |
| EP | 1488867 A1 | 12/2004 |
| FR | 2635476 A1 | 2/1990 |
| GB | 255970 A | 8/1926 |
| GB | 578008 A | 6/1946 |
| GB | 619950 A | 3/1949 |
| GB | 731895 A | 6/1955 |
| GB | 1536728 A | 12/1978 |
| GB | 2056626 A | 3/1981 |
| GB | 2117822 A | 10/1983 |
| GB | 2140338 A | 11/1984 |
| GB | 2185287 A | 7/1987 |
| GB | 2228885 A | 9/1990 |
| GB | 2312728 B | 5/2000 |
| GB | 2355510 A | 4/2001 |
| GB | 2408562 A | 6/2005 |
| GB | 2416574 B | 8/2008 |
| GB | 2413606 B | 3/2009 |
| GB | 2444822 B | 6/2011 |
| GB | 2452801 B | 4/2012 |
| GB | 2493900 A | 2/2013 |
| GB | 2521300 A | 6/2015 |
| IN | 251691 | 8/2012 |
| JP | 53108873 A | 9/1978 |
| JP | 53125261 A | 11/1978 |
| JP | 57073187 | 5/1982 |
| JP | 57079400 | 5/1982 |
| JP | 61093344 | 5/1986 |
| JP | 08075022 | 3/1996 |
| JP | 08128536 | 5/1996 |
| JP | 08291543 A | 11/1996 |
| JP | 08300052 | 11/1996 |
| JP | 10175026 | 6/1998 |
| JP | 2000330646 | 11/2000 |
| JP | 2001355774 A | 12/2001 |
| JP | 2002098068 | 4/2002 |
| JP | 2004190769 A | 7/2004 |
| JP | 2006194334 A | 7/2006 |
| JP | D1285004 | 9/2006 |
| JP | 2008215626 A | 9/2008 |
| JP | 4996990 B2 | 8/2012 |
| JP | 05033883 | 9/2012 |
| KR | 100540389 B1 | 12/2005 |
| KR | 100540390 B1 | 12/2005 |
| KR | 100540392 B1 | 12/2005 |
| KR | 100621158 B1 | 8/2006 |
| KR | 100716760 B1 | 5/2007 |
| KR | 100832065 B1 | 5/2008 |
| KR | 101191630 B1 | 10/2012 |
| MX | 2011011007 A | 2/2012 |
| MX | 2011012944 A | 6/2012 |
| MX | 40533 | 12/2013 |
| RU | 1466084 C | 6/1995 |
| RU | 1417281 C | 7/1995 |
| RU | 02088831 C1 | 8/1997 |
| RU | 2242313 C2 | 12/2004 |
| RU | 2367770 C1 | 9/2009 |
| RU | 2367771 C1 | 9/2009 |
| SG | 175263 A1 | 11/2011 |
| SG | 176534 A1 | 1/2012 |
| SG | D2013186 G | 4/2013 |
| SU | 567001 A1 | 7/1977 |

(56) References Cited

FOREIGN PATENT DOCUMENTS

| SU | 585898 A1 | 12/1977 |
|---|---|---|
| SU | 1391769 A1 | 4/1988 |
| SU | 1721368 A1 | 3/1992 |
| WO | WO-9713398 A2 | 4/1997 |
| WO | WO-9956047 A2 | 11/1999 |
| WO | WO-2009023042 A1 | 2/2009 |
| WO | WO-2010080636 A2 | 7/2010 |
| WO | WO-2010123889 A2 | 10/2010 |
| WO | WO-2010141651 A2 | 12/2010 |
| WO | WO-2010151680 A2 | 12/2010 |
| WO | WO-2011095453 A1 | 8/2011 |
| WO | WO-2013023154 A1 | 2/2013 |
| WO | WO-2014028498 A2 | 2/2014 |
| WO | WO-2014028795 A2 | 2/2014 |
| WO | WO-2015002863 A1 | 1/2015 |

OTHER PUBLICATIONS

CN OA 2010800253503 mailed Jun. 5, 2013 (8 pages).
EP Search Report mailed Jan. 30, 2013 for EP09838004.1 (4 pages).
Grayloc(r) Products, 3" flange diameter, Jul. 24, 2006 (2 pages).
Harrisburg, Inc., "Reset Relief Valves" brochure, (c) 1982) (2 pages).
HP70-001 OA for U.S. Appl. No. 06/419,141 mailed Nov. 17, 1983 (4 pages).
HP70-006 OA for U.S. Appl. No. 08/643,239 mailed Dec. 30, 1996 (11 pages).
HP70-011 NOA for U.S. Appl. No. 10/690,888 mailed Aug. 29, 2005 (7 pages).
HP70-016 NOA for U.S. Appl. No. 10/833,859 mailed Jul. 6, 2005 (4 pages).
HP70-016 OA for U.S. Appl. No. 10/833,859 mailed Dec. 22, 2004 (5 pages).
HP70-021 NOA for U.S. Appl. No. 11/013,486 mailed Feb. 12, 2007 (4 pages).
HP70-021 NOA for U.S. Appl. No. 11/414,984 mailed Feb. 11, 2009 (8 pages).
HP70-021 OA for U.S. Appl. No. 11/013,486 mailed Aug. 30, 2005 (12 pages).
HP70-022 NOA for U.S. Appl. No. 11/354,663 mailed Jun. 29, 2010 (4 pages).
HP70-022 OA for U.S. Appl. No. 11/354,663 mailed Jan. 8, 2010 (6 pages).
HP70-023 CA 2612397 NOA mailed Dec. 20, 2012 (1 page).
HP70-023 NOA for U.S. Appl. No. 11/638,965 mailed Sep. 23, 2008 (6 pages).
HP70-023 OA for U.S. Appl. No. 11/638,965 mailed Apr. 4, 2008 (10 pages).
HP70-024 Advisory Action mailed May 20, 2013 for U.S. Appl. No. 12/165,680 (3 pages).
HP70-024 Final Office Action dated Jan. 31, 2012 for U.S. Appl. No. 12/165,680 (28 pages).
HP70-024 Final Office Action dated Mar. 7, 2013 for U.S. Appl. No. 12/165,680 (23 pages).
HP70-024 Office Action mailed Aug. 9, 2011 for U.S. Appl. No. 12/165,680 (18 pages).
HP70-024 Office Action mailed Jul. 12, 2013 for U.S. Appl. No. 12/165,680 (24 pages).
HP70-024 Office Action mailed May 31, 2011 for GB 0812086.7 (2 pages).
HP70-029 ISR and WO for PCT/US2009/068822 mailed Aug. 9, 2010 (7 pages).
HP70-029 OA for U.S. Appl. No. 12/642,541 mailed Mar. 19, 2012 (15 pages).
HP70-036 EP Extended SR for EP10767632.2 mailed Mar. 14, 2013 (6 pages).
HP70-036 EP SR for EP10767632.2 mailed Mar. 14, 2013 (6 pages).
HP70-036 ISR and WO for PCT/US2010/031738 mailed Dec. 27, 2010 (7 pages).
HP70-036 NOA for U.S. Appl. No. 12/763,786 mailed May 16, 2012 (6 pages).
HP70-036 OA for U.S. Appl. No. 12/763,786 mailed Oct. 11, 2011 (9 pages).
HP70-036 OA for U.S. Appl. No. 13/608,562 mailed Sep. 13, 2013 (12 pages).
HP70-037 EP Extended SR for EP10784052.2 mailed Jul. 4, 2013 (7 pages).
HP70-037 ISR and WO for PCTUS2010/037156 mailed Jan. 13, 2011 (8 pages).
HP70-037 NOA for U.S. Appl. No. 12/793,194 mailed Feb. 19, 2013 (10 pages).
HP70-037 OA for U.S. Appl. No. 12/793,194 mailed Oct. 25, 2012 (8 pages).
HP70-039 FOA for U.S. Appl. No. 12/822,900 mailed Aug. 16, 2013 (15 pages).
HP70-039 ISR and WO for PCT/US2010/039834 Feb. 8, 2011 (6 pages).
HP70-039 OA for U.S. Appl. No. 12/822,900 mailed Dec. 6, 2012 (20 pages).
HP70-072 IPRP for PCT/US2012/050376 mailed Jul. 15, 2013 (28 pages).
HP70-072 ISR and WO for PCT/US2012/050376 mailed Oct. 26, 2012 (2 pages).
HP70-714 IN Exam Report for IN Design 251691 mailed Jun. 26, 2013 (2 pages).
S.P.M. Flow Control, Inc. (Weir SPM), "Long Radius Swivel Joints," 2007 (5 pages).
S.P.M. Flow Control, Inc., "Flow Control Products and Drilling Equipment for the Worldwide Petroleum Industry," [online] Jan. 8, 2007, <URL:www.spmflo.com>.
S.P.M. Flow Control, Inc., "High-Pressure Long Radius Swivel Joints," 2002, www.spmflo.com (1 page).
S.P.M. Flow Control, Inc., "Long Radius Swivel Joints, H2S, Operating and Maintenance Instructions," 1999 (6 pages).
S.P.M. Flow Control, Inc., "Long Radius Swivel Joints, Operating and Maintenance Instructions," 2004 (4 pages).
S.P.M. Flow Control, Inc., "Long Radius Swivel Joints, Operating and Maintenance Instructions," 2006 (6 pages).
S.P.M. Flow Control, Inc., "Swivel Joints," 1999 (1 page).
SPM "Emergency Relief Valve Brochure" 1997 (4 pages).
International Search Report and Written Opinion issued Feb. 7, 2014 in PCT/US2013/054741.
"Canadian Examiner's Report issued Feb. 10, 2014, by CIPO, re App No. 152957".
"Eurasian Office Action issued Nov. 19, 2013, by The Eurasian Patent Office, re App No. 201171356".
"Notice of Allowance mailed Feb. 7, 2014, by the USPTO, re U.S. Appl. No. 29/449,852".
"Notice of Allowance mailed Feb. 7, 2014, by the USPTO, re U.S. Appl. No. 29/449,867".
"Notice of Allowance mailed Jan. 16, 2014, by the USPTO, re U.S. Appl. No. 29/453,837".
"Notice of Allowance mailed Nov. 22, 2013, by the USPTO, re U.S. Appl. No. 12/822,900".
"Notice of Allowance mailed Nov. 26, 2013, by the USPTO, re U.S. Appl. No. 29/429,809".
"Office Action mailed Mar. 27, 2014, by the USPTO, re U.S. Appl. No. 13/918,479".
International Supplemental Written Opinion for PCT/US13/54741 mailed on Jul. 28, 2014 (7 pgs).
Brazil Office Action, dated Jun. 3, 2014, re App No. BR3020130006611.
Canadian Examination Report, by CIPO, mailed Feb. 10, 2014, re App No. 152956.
Canadian Examination Report dated Apr. 28, 2014, by the CIPO, re App No. 2764310.
Canadian Examination Report dated Feb. 7, 2014, by the CIPO, re App No. 149748.
European Exam Report, by the EPO, dated Apr. 8, 2014, re App No. 10784052.2.
Final Office Action mailed Apr. 25, 2014, by the USPTO, re U.S. Appl. No. 13/608,562.

(56) References Cited

OTHER PUBLICATIONS

Final Office Action mailed Feb. 28, 2014, by the USPTO, re U.S. Appl. No. 12/165,680.
Notice of Allowance mailed Jun. 25, 2014, by the USPTO, re U.S. Appl. No. 12/165,680.
Office Action mailed Jun. 18, 2014, by the USPTO, re U.S. Appl. No. 13/572,293.
International Preliminary Report on Patentability mailed Nov. 17, 2014 in corresponding PCT Application PCT/US13/54741; 31 pages.
10 Station AFAM Trailer, FMC, Oct. 28, 2011, 6 pages.
Australian Exam Report, issued Sep. 25, 2014, by IP Australia, re App No. 2010239366.
Canadian Exam Report dated Jul. 29, 2014, issued by CIPO, re App No. 2636751.
Canadian Notice of Allowance mailed Dec. 17, 2014, by the Canadian IP Office, re App No. 2764310.
Canadian Notice of Allowanced mailed Jun. 22, 2015, by the CIPO, re App No. 2636751.
Final Office Action mailed Jan. 5, 2015, by the USPTO, re U.S. Appl. No. 13/572,293.
Final Office Action mailed Nov. 6, 2014, by the USPTO, re U.S. Appl. No. 13/965,848.
International Search Report and Written Opinion by the ISA/US, mailed Dec. 16, 2014, re PCT/US2014/044813.
International Search Report and Written Opinion, mailed Jan. 23, 2015, by the ISA/EP, re PCT/US2013/055257.
Notice of Allowance mailed Apr. 10, 2015, by the USPTO, re U.S. Appl. No. 29/493,861.
Notice of Allowance mailed Apr. 9, 2015, by the USPTO, re U.S. Appl. No. 13/965,848.
Notice of Allowance mailed Dec. 17, 2015, by the USPTO, re U.S. Appl. No. 13/886,771.
Notice of Allowance mailed Dec. 26, 2014, by the USPTO, re U.S. Appl. No. 13/918,479.
Notice of Allowance mailed Jan. 16, 2014, by the USPTO, re U.S. Appl. No. 29/453,837.
Notice of Allowance mailed Nov. 28, 2014, by the USPTO, re U.S. Appl. No. 13/608,562.
Notice of Allowance mailed Oct. 27, 2015, by the USPTO, re U.S. Appl. No. 13/964,863.
Office Action mailed Apr. 30, 2015, by the USPTO, re U.S. Appl. No. 13/886,771.
Office Action mailed Jul. 10, 2015, by the USPTO, re U.S. Appl. No. 13/964,863.
Office Action mailed Jul. 31, 2014, by the USPTO, re U.S. Appl. No. 13/965,848.
Okasnen, "Singer Model DLA-RPS Air operated surge anticipating electrically timed sewage relief valve," Dec. 8, 2010, XP055159354.
Weir SPM Safety Iron Manifold Trailer, 2008, 2 pages.

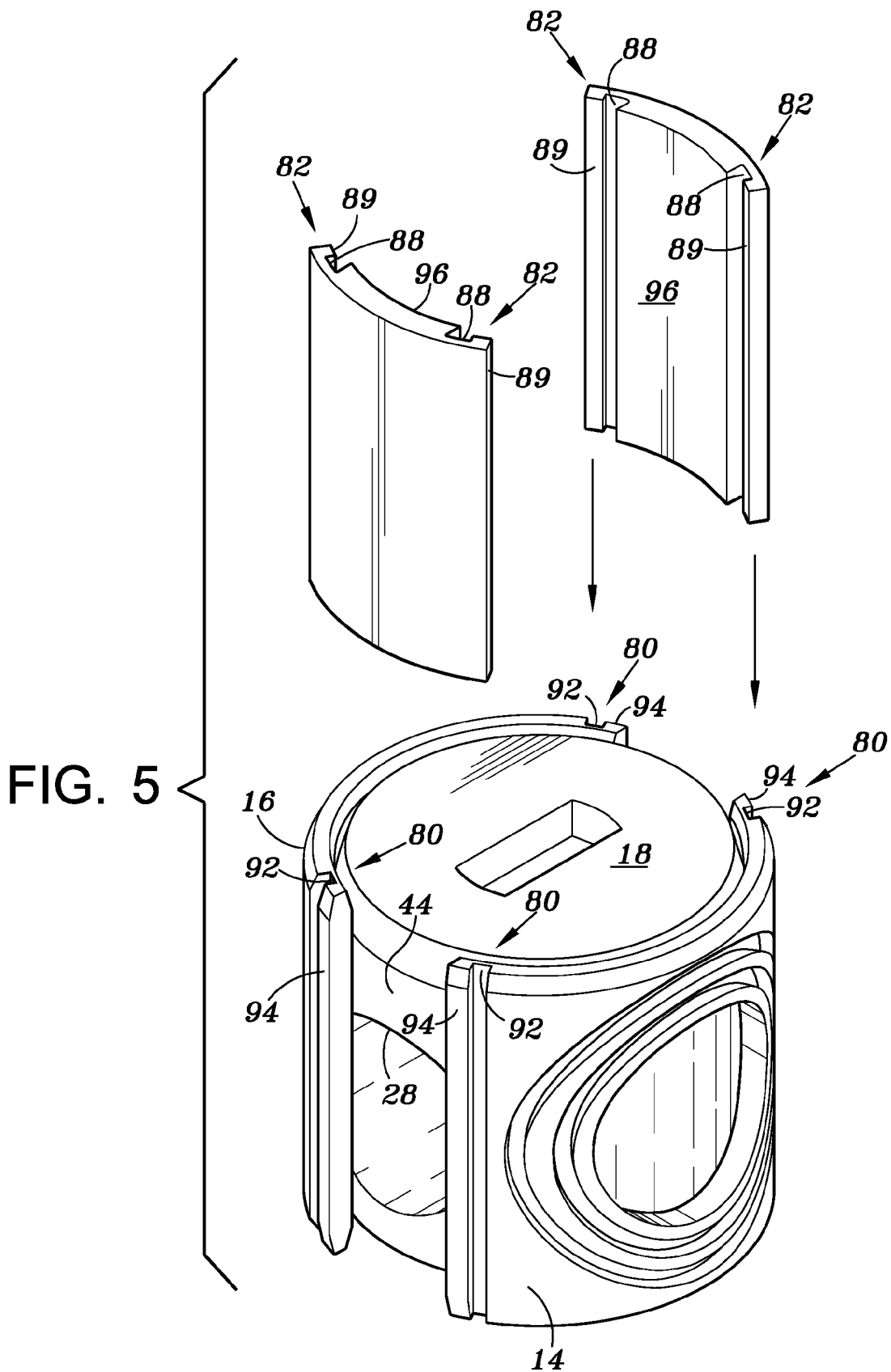

PLUG VALVE HAVING PRELOADED SEAL SEGMENTS

CROSS-REFERENCE TO RELATED APPLICATIONS

This application is a continuation of co-pending U.S. patent application Ser. No. 13/965,848 filed Aug. 13, 2013, which claims priority to U.S. Provisional Patent Application No. 61/684,008 filed Aug. 16, 2012, both of which are incorporated herein by reference in their entirety.

TECHNICAL FIELD

This disclosure relates to plug valves, and more particularly, to a seal assembly for plug valves, and even more particularly, to a preloaded seal assembly for plug valves.

BACKGROUND OF THE DISCLOSURE

Plug valves typically include a body having an inlet port, an outlet port and a central chamber extending between the inlet and outlet ports. A plug member is rotatably positioned inside the central chamber sandwiched between an upstream seal segment and a downstream seal segment. Each seal segment includes a through bore that is aligned with the respective inlet and outlet ports to form a flow passage through the plug valve body. The plug member also includes a central bore extending therethrough such that during operation, the plug member rotates between an open position, to align the central bore with the flow passage to facilitate fluid flow through the plug valve, and a closed position, to offset the central bore from the flow passage to block fluid flow through the plug valve.

Plug valves are designed so that the plug member shifts or otherwise "drifts" small amounts in the axial direction relative to the flow of fluid. This drift oftentimes enables fluid particulate to migrate between the plug member and the seal segments. For example, when the plug valve is in a closed position, the plug member drifts apart from the upstream seal segment causing a gap to form between an inner surface of the inlet seal segment and an outer surface of the plug member. As a result, fluid and other fine particles such as, for example, frac sand, that flow through the plug valve will migrate between the seal segment and the plug member, which can accumulate, causing an increase in friction or imbed therebetween, which ultimately diminishes seal performance.

SUMMARY

In a first aspect, there is provided a plug valve having a valve body with an inlet port, an outlet port and a central chamber extending between the inlet port and the outlet port. An inlet seal segment is disposed within the central chamber and includes a bore extending therethrough and aligned with the inlet port. The plug valve further includes an outlet seal segment disposed within the central chamber having a bore extending therethrough and aligned with the outlet port. A plug member is disposed in the central chamber, the plug member moveable between an open position, to facilitate fluid flow through the plug valve, and a closed position, to block fluid flow through the plug valve. The plug valve further includes a first side segment and a second side segment detached and spaced apart from the first side segment, wherein the first and the second side segments are secured to and tensioned between the inlet seal segment and the outlet seal segment to prevent the flow of fluid between the seal segments and the plug member.

In certain embodiments, the inlet and outlet seal segments each include a pair of recesses disposed on an outer face and are configured to receive corresponding extensions on an inner face of the first and second side segments for coupling the seal segments and the side segments together.

In other certain embodiments, the first and second side segments include a pair of recesses disposed on an inner face and are configured to receive corresponding extensions on an outer face of the inlet and outlet seal segments.

In yet another embodiment, the first and second side segments are formed of urethane.

In still other embodiments, the first and second side segments include an inner arcuate surface, wherein a central section of the inner arcuate surface is spaced apart from the plug member to reduce friction between the plug member and the first and second side sections during movement of the plug member between the open and closed positions.

In another embodiment, the first and second side segments and the inlet and outlet seal segments form an inner diameter that is sized smaller than an outer diameter of the plug member when the seal segments, the side segments, and the plug member are not loaded or assembled. Furthermore, when assembled, the seal segments and side segments encircle the plug member such that the side segments are tensioned to preload the seal segments against the plug member.

In yet another embodiments, the preload force is between about 445 N (100 lbf) to about 2002 N (450 lbf).

In still another embodiment, the preload force is between about 667 N (150 lbf) to about 1780 N (400 lbf).

In yet another embodiment, the preload force is between about 1112 N (250 lbf) to about 1557 N (350 lbf).

In a second aspect, there is provided a plug valve that includes a valve body having an inlet port, an outlet port and a central chamber extending between the inlet port and the outlet port. The plug valve includes an inlet and an outlet seal segment disposed within the central chamber proximate the inlet and outlet ports, respectively, each having a bore extending therethrough and coaxially aligned with valve body inlet and outlet ports. A plug member is disposed in the central chamber, the plug member being rotatable between an open position, to facilitate fluid flow through the plug valve, and a closed position, to block fluid flow through the plug valve. The plug valve includes at least one side segment extending less than halfway around a perimeter of the plug member, the at least one side segment having ends secured to respective ends of the inlet and outlet seal segments, the at least one side segment and the seal segments encircle the plug member such that the at least one side segment is tensioned to position the seal members against the plug to form a seal between the plug and the seal segments to prevent the flow of fluid between the seal segments and the plug member.

In certain embodiments, the at least one side segment includes a pair of side segments each extending less than halfway around the circumference of the plug and having ends nesting with respective ends of the inlet and outlet seal segments to interlock the side segments to the inlet and outlet seal segments.

In other certain embodiments, the inlet and outlet seal segments each include a pair of recesses disposed on an outer face configured to receive corresponding extensions on an inner face of the at least one side segment to interlock the seal segments and the at least one side segment together.

In still other embodiments, the at least one side segment includes a pair of recesses disposed on an inner face to receive corresponding extensions on an outer face of the inlet and outlet seal segments.

In yet other embodiments, the at least one side segment is formed of urethane.

In yet another embodiment, the at least one side segment is tensioned to pull the seal members against the plug with a force of between about 445 N (100 lbf) to about 2002 N (450 lbf).

In other embodiments, the at least one side segment includes an inner arcuate surface, wherein a central section of the inner arcuate surface is spaced apart from the plug member to form a gap between the at least one side segment and the plug member to reduce friction between the plug member and the at least one side segment during movement of the plug member between the open and closed positions.

In still another embodiment, the at least one side segment and the inlet and outlet seal segments form an inner diameter that is sized smaller than an outer diameter of the plug member when the seal segments, the at least one side segment, and the plug member are not loaded or assembled. Furthermore, when assembled, the at least one side segment and the inlet and outlet seal segments encircle the plug member such that the at least one side segment is tensioned to preload the seal segments against the plug member.

In a third aspect, there is provided a method of assembling a plug valve that includes providing a valve body having an inlet port, an outlet port and a central chamber extending between the inlet port and the outlet port and inserting an inlet seal segment and an outlet seal segment within the central chamber proximate the inlet and outlet ports, respectively, such that respective bores extending through the inlet and outlet seal segments are coaxially aligned with valve body inlet and outlet ports. The method further includes inserting at least one side segment between respective ends of the inlet and outlet seal segments and securing ends of the at least one side segment to respective ends of the inlet and outlet seal segments, the at least one side segment and the seal segments configured to encircle and form a plug receiving area having an inner diameter. The method also includes inserting a plug member having an outer diameter sized larger than the receiving area inner diameter to tension the inlet and outlet seal members against the plug to form a seal between the plug and the seal segments.

In certain embodiments, inserting the at least one side segment includes inserting a pair of side segments having ends nesting with respective ends of the inlet and outlet seal segments to couple the side segments with the inlet and outlet seal segments.

In other certain embodiments, the method includes forming extensions on an inner face of the pair of side segments and forming a pair of recesses on an outer face of the inlet and outlet seal segments to receive corresponding extensions on the pair of side segments and inserting the extensions on the side segments in the recesses on the seal segments to couple the seal segments and side segments together.

In a further aspect, there is provided a plug valve including a valve body having an inlet port, an outlet port and a central chamber extending between the inlet port and the outlet port, inlet and an outlet seal segments disposed within the central chamber proximate the inlet and outlet ports, respectively, each having a bore extending therethrough and coaxially aligned with valve body inlet and outlet ports. The plug valve further includes a plug member disposed in the central chamber, the plug member rotatable between an open position, to facilitate fluid flow through the plug valve, and a closed position, to block fluid flow through the plug valve. The plug valve utilizes at least one side segment having a length to extend less than halfway around a perimeter of the plug member, the at least one side segment having extensions extending from an inner face of the at least one side segment to interlock within corresponding recesses on an outer face of the inlet and outlet seal segments.

In certain embodiments, each extension has a right angle corner for engaging the recess of the seal segment.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments.

FIG. 5 is an exploded perspective view of the seal assembly of FIG. 4.

DETAILED DESCRIPTION

Figure 1:
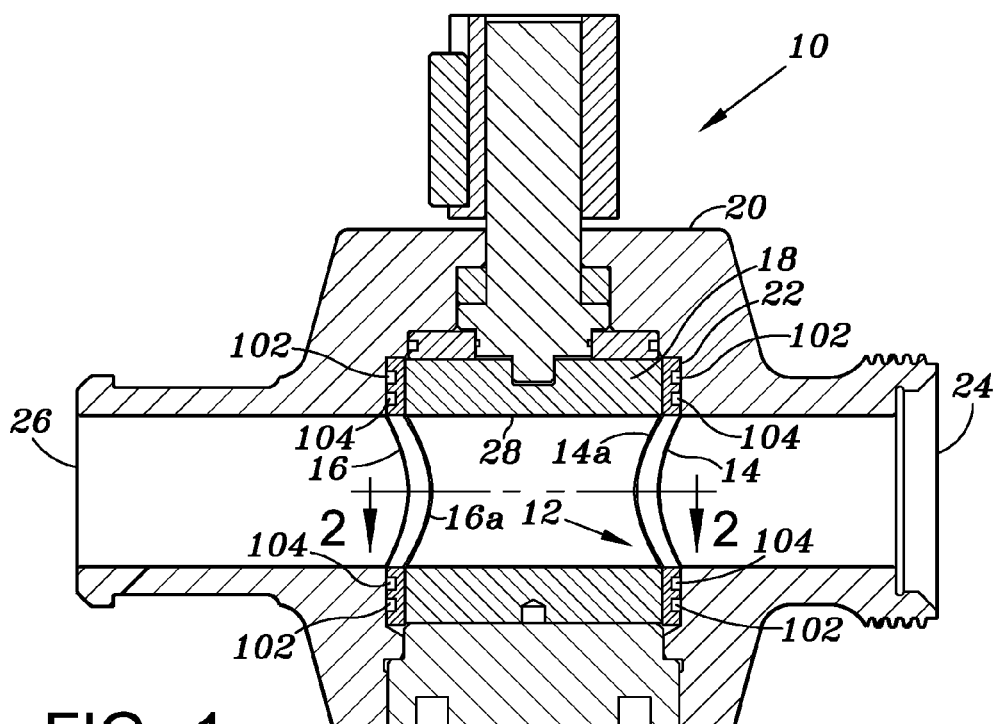
FIG. 1 is a section view of a plug valve having a preloaded seal assembly.

Referring to FIGS. 1-5, a plug valve 10 is illustrated employing a seal assembly 12 for providing a preload between an inlet seal segment 14 and an outlet seal segment 16 against a plug member 18. As explained in further detail below, this preload acts to prevent unwanted particulate and debris such as, for example, sand from frac fluid, from migrating between the plug member 18 and each respective seal segment 14 and 16 during instances of low pressures. Such unwanted particulate and debris causes increased friction thereby limiting movement of the plug valve and reduces seal performance.

Referring specifically to FIG. 1, the plug valve 10 includes a valve body 20 with a central chamber 22 disposed between and connecting an inlet port 24 and an outlet port 26. The inlet seal segment 14 and the outlet seal segment 16 are disposed within the central chamber 22 and each include a bore 14a and 16a, respectively, extending therethrough and aligned with an axis 25 of the inlet and outlet ports 24 and 26. As illustrated in FIG. 1, the plug member 18 is disposed within the central chamber 22 and is sandwiched between the inlet and outlet seal segments 14 and 16. The plug member 18 includes a central bore 28 extending therethrough and is movable between an open position, such that the central bore 26 is aligned with the inlet and the outlet ports 24 and 26 to facilitate fluid flow through the plug valve 10, and a closed position, such that the central bore 26 is offset from and blocks the inlet and outlet ports 24 and 26 to prevent fluid flow through the plug valve 10.

Figure 2:
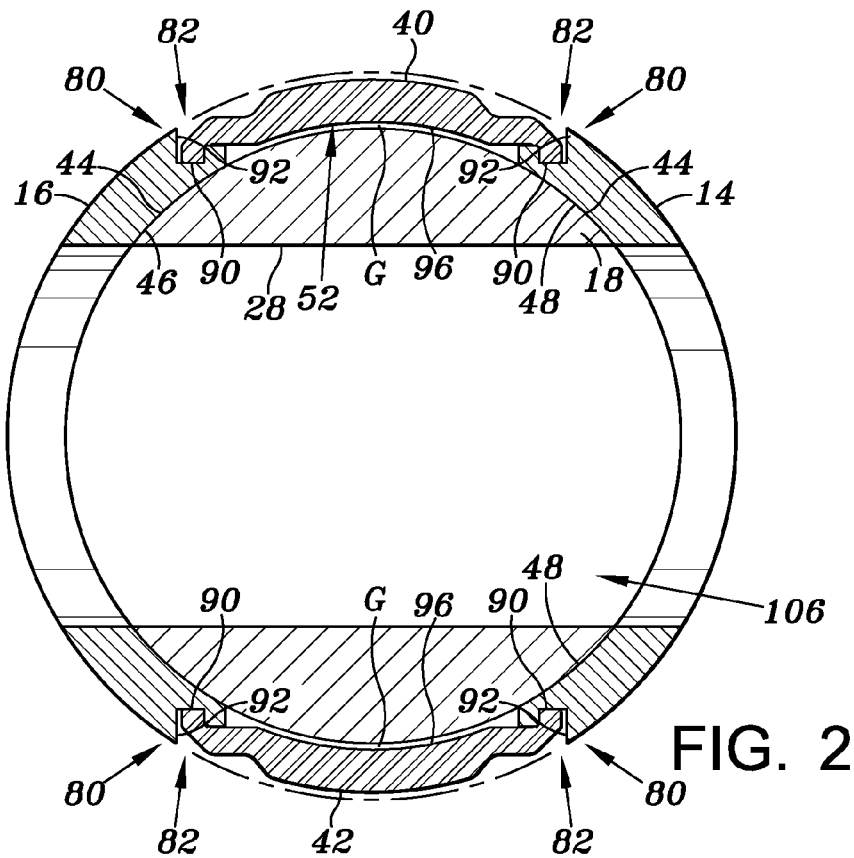
FIG. 2 is a section view of the plug valve of FIG. 1 taken along the line 2-2.
Figure 3:
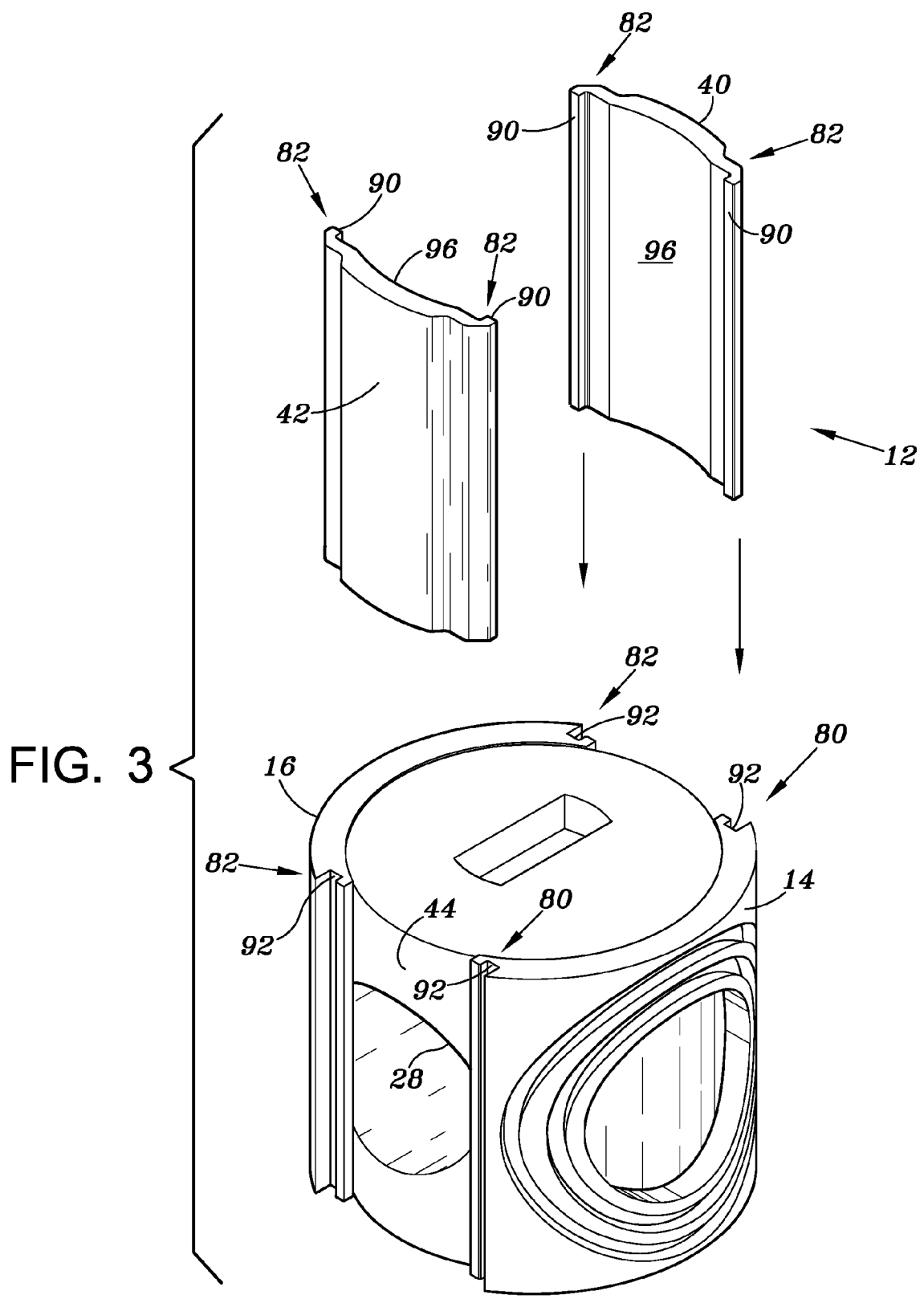
FIG. 3 is an exploded perspective view of the seal assembly of FIGS. 1 and 2.

Referring specifically to FIGS. 2 and 3, the seal assembly 12 includes the inlet seal segment 14 and the outlet seal segment 16 interlocked together via a pair of side segments 40 and 42 to encircle the plug member 18. The side segments 40 and 42, when interlocked and disposed around the plug member 18, are placed under tension so as to preload and/or otherwise pull the seal segments 14 and 16 inward and against an outer surface 44 of the plug member 18. This preload exists prior to any pressurization of the plug valve 10 and is configured to prevent fluid migration between the outer surface 44 of the plug member 18 and the respective seal segments 14 and 16 when exposed to low pressures. For example, when the valve is in the closed position, fluid pressure from an upstream pressure source (not illustrated) acts on and causes the plug member 18 to drift inside the central chamber 22 and otherwise move into tight metal-to-metal sealing engagement against an inner face 46 of the outlet seal segment 16. As such, a small gap forms between an inner face 48 of the inlet seal segment 14 and the outer surface 44 of the plug member 18. To avoid such gaps, the side segments 42 and 44 act to force or otherwise pull the inlet seal segment 14 into metal-to-metal contact such that the inner face 48 of the inlet seal segment 14 contacts and forms a metal-to-metal seal with the outer surface 44 of the plug member 18. This prevents the migration of fluid and fine particles between the seal segment 14 and the plug member 18. Similarly, when the plug member 18 is in the open position, the side segments 40 and 42 are tensioned to force or otherwise pull both the inlet seal segment 14 and the outlet seal segment 16 into metal to metal contact with the outer surface of the plug member 18 to prevent fluid migration between the plug member 18 and each respective seal segment 14 and 16.

In FIGS. 2 and 3, the inlet and outlet seal segments 14 and 16 and the side segments 40 and 42 each have respective ends that interlock and/or otherwise nest to enable the seal assembly 12 to encircle the plug member 18. The seal assembly 12, when interlocked, forms an inner circular surface 52 having an inner diameter that is sized slightly smaller than an outer diameter of the plug member 18. Accordingly, when the seal assembly 12 is disposed around the plug member 18, the side segments 40 and 42 are stretched and thus, are tensioned to preload and otherwise "pull" the seal segments 14 and 16 inwardly against the outer surface 44 of the plug member 18. According to embodiments disclosed herein, the preload forces generated by the side segments 40 and 42 range from anywhere between, for example, about 445 N (100 lbf) to about 5338 N (1200 lbf), although preload force values outside of this range are also acceptable. For example, in one embodiment, the preload force is a value greater than 5338 N (1200 lbf). In other embodiments, the preload force is in a range greater than zero and less than about 5338 N (1200 lbf). In other embodiments, the preload force is in a range greater than zero and less than about 4895 N (1100 lbf). In other embodiments, the preload force is in a range from less than 445 N (100 lbf) and greater than zero N. In yet other embodiments, the preload forces generated by the side segments 40 and 42 range from anywhere from about 890 N (200 lbf) to about 4893 N (1100 lbf). According to an embodiment disclosed herein, the first and second side segments 42 and 44 are molded from an elastomeric material such as, but not limited to, polyurethane, with sufficient elasticity to provide the preload force.

In the embodiment illustrated in FIGS. 2 and 3, the ends 80 of each of the respective inlet and outlet seal segments 14 and 16 include a groove or a recessed portion 92 that are sized to receive corresponding extensions 90 disposed on each of the ends 82 of the side segments 40 and 42. Thus, when tension is applied to the seal assembly 12, and in particular, to side segments 40 and 42, the seal assembly 12 remains interlocked to prevent separation. As illustrated in FIG. 3, an inner surface 96 of each of the side segments 40 and 42 is spaced apart from the outer surface 44 of the plug member 18 to form a gap G therebetween. Accordingly, by having a gap G, surface-to-surface contact between the side segments 40 and 42 and the plug valve 18 is eliminated, which reduces and can even eliminate any associated friction between the side segments 40 and 42 and the plug valve 18.

Figure 4:
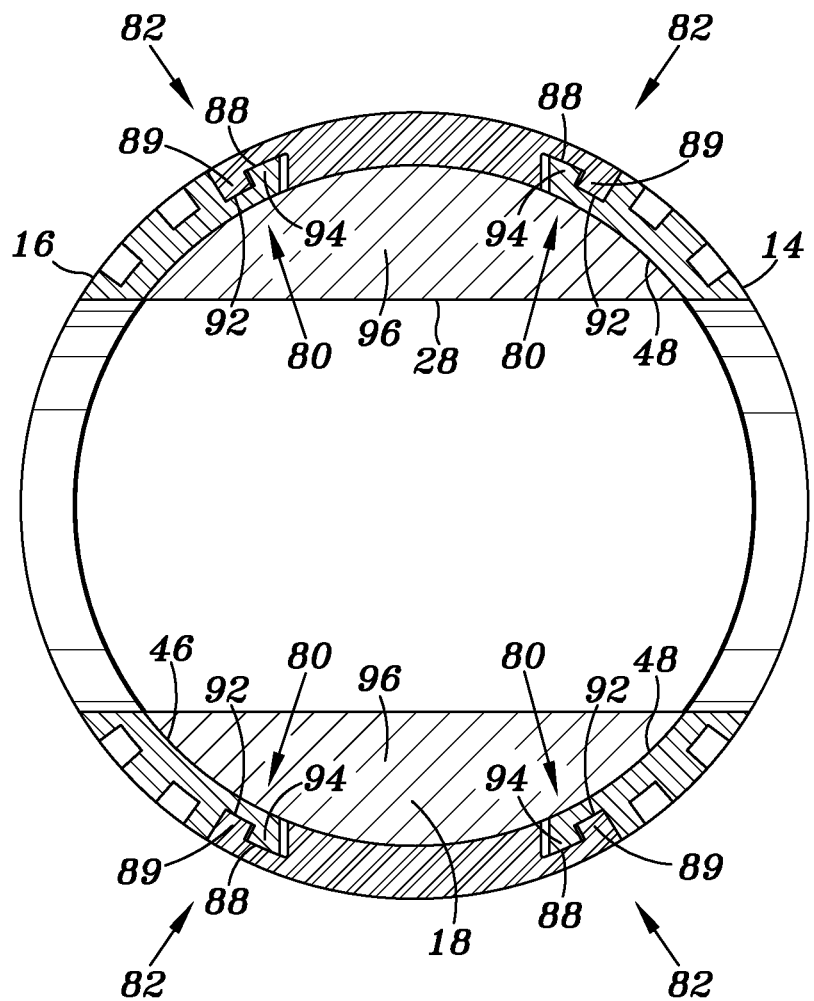
FIG. 4 is a section view of an alternate configuration of the seal assembly.

In an alternate embodiment, as illustrated in FIGS. 4 and 5 and includes several components given the same reference numerals as provided in FIGS. 1-3, the ends 80 of each of the respective inlet and outlet seal segments 14 and 16 include a shape/configuration that is generally complementary to the shape/configuration of the ends 80 of each of the respective side segments 40 and 42. For example, the ends 82 of side segments 40 and 42 include a groove or pocket 88 and an extension 89 disposed on the inner face 96 of the side segments 40 and 42. The grooves 88 and the extensions 89 are sized and positioned to mate or otherwise nest with the corresponding groove 92 and extension 94 on each of the inlet and outlet seal segments 14 and 16. The grooves 88 and 92 and extensions 89 and 94 are sized so as to nest and interlock the seal assembly 12 together such that, as explained in further detail below, when tension is applied to the seal assembly 12, and in particular, side segments 40 and 42, the seal assembly 12 remains interlocked and will not separate.

According to some embodiments, the ends 80, and 82 optionally include a stiffener or reinforcement mechanism (not illustrated) disposed therein to reduce or eliminate the likelihood of deformation of the ends 80 and 82 when tensile stresses are applied to the side segments 40 and 42. In one embodiment, the stiffener mechanism includes molding the inserts with metal rods, mesh, or plates inside or proximate the ends 80 and 82.

The seal assembly 12 is assembled by accessing the central chamber 22 by removing a cover or cap 100 and inserting the inlet seal segment 14 and the outlet seal segment 16 inside the central chamber 22 proximate the inlet and outlet ports 24 and 26, respectively. The seal segments 14 and 16 are oriented such that the respective bores 14a and 16a are coaxially aligned with the inlet and outlet ports 24 and 26. Each seal segment 14 and 16 is secured by one or more pins (not illustrated) to prevent relative lateral movement of the segments 14 and 16 such that the bores 14a and 16a remain coaxially aligned with the inlet and outlet ports 24 and 26. Furthermore, in an exemplary embodiment, each seal segment 14 and 16 is sealed to the body preferably by a pair of concentric seals 102 and 104 (FIG. 1) on the seal segments 14 and 16. In yet another embodiment, each inlet and outlet seal segment 14 and 16 is sealed to the plug valve member 18 by at least one concentric seal positioned in grooves located in at least one of the seal segments 14 and 16 and side segments 40 and 42. In other embodiments, at least one of the inlet and outlet seal segments 14 and 16 is sealed to the plug valve member 18 by at least one concentric seal positioned in or on at least one of the seal segments 14 and 16 and side segments 40 and 42. An embodiment provides that the concentric seal may be constructed of an elastomeric or metal material.

Once the seal segments 14 and 16 are positioned within central chamber 22, the side segments are positioned between the ends 80 of the seal segments 14 and 16. In particular, the extensions 90 on the side segments 42 and 44 are aligned with the respective grooves 92 on seal segments 14 and 16 so that the side segments 40 and 42 are nested or otherwise interlocked with the seal segments 14 and 16 to enable the seal assembly 12 to encircle and form a receiving area 106 to frictionally engage the plug member 18. As previously explained, the size of the inner diameter of the seal assembly 12 relative to the outer diameter of the plug member 18 causes the side segments 40 and 42 to deform or otherwise stretch in order to tension the seal assembly 12, and thus pull the seal segments 14 and 16 against the outer surface 44 of the plug valve 18. This creates an inward pulling force to thereby preload the inlet and outlet seal members against the plug 18 to form a seal between the plug and the seal segments 14 and 16 in low pressure conditions to prevent migration of particles therebetween.

In operation, a valve stem is turned by a handle to rotate the plug member 18, between the open and closed positions. In the closed position, the fluid pressure within the central chamber 22 will force the plug member 18 against the outlet seal segment 16 to form a metal-to-metal seal between the plug member 18 and the seal segment 16. This metal-to-metal seal will prevent the fluid in the cavity 18 from migrating between the plug member 18 and the seal segment 16. Furthermore, due to the float between the seal segments and the plug member 18, when the valve is in the open position, the preload on the seal segments 14 and 16 prevents particles in the fluid from migrating between the plug member 18 and the seal segments 14 and 16, thereby facilitating an effective metal-to-metal seal with the downstream seal segment when the valve is closed.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and "right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A plug valve comprising:
    a valve body having an inlet port, an outlet port and a central chamber extending between the inlet port and the outlet port;
    an inlet seal segment disposed within the central chamber and having a bore extending therethrough and aligned with the inlet port;
    an outlet seal segment disposed within the central chamber having a bore extending therethrough and aligned with the outlet port;
    a plug member disposed in the central chamber, the plug member moveable between an open position, to facilitate fluid flow through the plug valve, and a closed position, to block fluid flow through the plug valve; and
    a first side segment and a second side segment detached and spaced apart from the first side segment, wherein the first and the second side segments are secured to and tensioned between the inlet seal segment and the outlet seal segment to prevent the flow of fluid between the seal segments and the plug member.

2. The plug valve of claim 1, wherein the inlet and outlet seal segments each include a pair of recesses disposed on an outer face configured to receive corresponding extensions on an inner face of the first and second side segments for coupling the seal segments and the side segments together.

3. The plug valve of claim 1, wherein the first and second side segments include a pair of recesses disposed on an inner face and configured to receive corresponding extensions on an outer face of the inlet and outlet seal segments.

4. The plug valve of claim 1, wherein the first and second side segments are formed of urethane.

5. The plug valve of claim 1, wherein the first and second side segments include an inner arcuate surface, wherein a central section of the inner arcuate surface is spaced apart from the plug member to reduce friction between the plug member and the first and second side sections during movement of the plug member between the open and closed positions.

6. The plug valve of claim 1, wherein the first and second side segments and the inlet and outlet seal segments form an inner diameter that is sized smaller than an outer diameter of the plug member when the seal segments, the side segments, and the plug member are not loaded or assembled; and wherein, when assembled, the seal segments and side segments encircle the plug member such that the side segments are tensioned to preload the seal segments against the plug member.

7. The plug valve of claim 6, wherein the preload force is between about 445 N (100 lbf) to about 2002 N (450 lbf).

8. The plug valve of claim 6, wherein the preload force is between about 667 N (150 lbf) to about 1780 N (400 lbf).

9. The plug valve of claim 6, wherein the preload force is between about 1112 N (250 lbf) to about 1557 N (350 lbf).

10. A plug valve comprising:
    a valve body having an inlet port, an outlet port and a central chamber extending between the inlet port and the outlet port;
    an inlet and an outlet seal segment disposed within the central chamber proximate the inlet and outlet ports, respectively, each having a bore extending therethrough and coaxially aligned with valve body inlet and outlet ports;
    a plug member disposed in the central chamber, the plug member rotatable between an open position, to facilitate fluid flow through the plug valve, and a closed position, to block fluid flow through the plug valve; and
    at least one side segment extending less than halfway around a perimeter of the plug member, the at least one side segment having ends secured to respective ends of the inlet and outlet seal segments, the at least one side segment and the seal segments encircle the plug member such that the at least one side segment is tensioned to position the seal members against the plug to form a seal between the plug and the seal segments to prevent the flow of fluid between the seal segments and the plug member.

11. The plug valve of claim 10, wherein the at least one side segment includes a pair of side segments each extending less than halfway around the circumference of the plug and having ends nesting with respective ends of the inlet and outlet seal segments to interlock the side segments to the inlet and outlet seal segments.

12. The plug valve of claim 10, wherein the inlet and outlet seal segments each include a pair of recesses disposed on an outer face configured to receive corresponding extensions on an inner face of the at least one side segment to interlock the seal segments and the at least one side segment together.

13. The plug valve of claim 10, wherein the at least one side segment includes a pair of recesses disposed on an inner face to receive corresponding extensions on an outer face of the inlet and outlet seal segments.

14. The plug valve of claim 10, wherein the at least one side segment is formed of urethane.

15. The plug valve of claim 10, wherein the at least one side segment is tensioned to pull the seal members against the plug with a force of between about 445 N (100 lbf) to about 2002 N (450 lbf).

16. The plug valve of claim 10, wherein the at least one side segment includes an inner arcuate surface, wherein a central section of the inner arcuate surface is spaced apart from the plug member to form a gap between the at least one side segment and the plug member to reduce friction between the plug member and the at least one side segment during movement of the plug member between the open and closed positions.

17. The plug valve of claim 10, wherein the at least one side segment and the inlet and outlet seal segments form an inner diameter that is sized smaller than an outer diameter of the plug member when the seal segments, the at least one side segment, and the plug member are not loaded or assembled; and wherein, when assembled, the at least one side segment and the inlet and outlet seal segments encircle the plug member such that the at least one side segment is tensioned to preload the seal segments against the plug member.

18. A method of assembling a plug valve, comprising:
providing a valve body having an inlet port, an outlet port and a central chamber extending between the inlet port and the outlet port;
inserting an inlet seal segment and an outlet seal segment within the central chamber proximate the inlet and outlet ports, respectively, such that respective bores extending through the inlet and outlet seal segments are coaxially aligned with valve body inlet and outlet ports;
inserting at least one side segment between respective ends of the inlet and outlet seal segments;
securing ends of the at least one side segment to respective ends of the inlet and outlet seal segments, the at least one side segment and the seal segments configured to encircle and form a plug receiving area having an inner diameter; and
inserting a plug member having an outer diameter sized larger than the receiving area inner diameter to tension the inlet and outlet seal members against the plug to form a seal between the plug and the seal segments.

19. The method of claim 18, wherein inserting the at least one side segment includes inserting a pair of side segments having ends nesting with respective ends of the inlet and outlet seal segments to couple the side segments with the inlet and outlet seal segments.

20. The method of claim 19 further comprising:
forming extensions on an inner face of the pair of side segments;
forming a pair of recesses on an outer face of the inlet and outlet seal segments to receive corresponding extensions on the pair of side segments; and
inserting the extensions on the side segments in the recesses on the seal segments to couple the seal segments and side segments together.

21. A plug valve including a valve body having an inlet port, an outlet port and a central chamber extending between the inlet port and the outlet port, inlet and outlet seal segments disposed within the central chamber proximate the inlet and outlet ports, respectively, each having respective terminal ends and a bore extending therethrough and coaxially aligned with valve body inlet and outlet ports, a plug member disposed in the central chamber, the plug member rotatable between an open position, to facilitate fluid flow through the plug valve, and a closed position, to block fluid flow through the plug valve, the plug valve comprising:
at least one side segment having a first terminal end and a second terminal end, and a length between the first terminal end and the second terminal end, the length extending less than halfway around a perimeter of the plug member, the at least one side segment having extensions extending from an inner face of the at least one side segment to interlock within corresponding recesses on an outer face of the inlet and outlet seal segments and secure the respective first and second terminal ends relative to the respective terminal ends of the inlet and outlet seal segments.

22. The side segment of claim 21, wherein each extension has a right angle corner for engaging a corresponding recess.

23. A plug valve including a valve body having an inlet port, an outlet port and a central chamber extending between the inlet port and the outlet port, inlet and outlet seal segments disposed within the central chamber proximate the inlet and outlet ports, respectively, each having a bore extending therethrough and coaxially aligned with valve body inlet and outlet ports, a plug member disposed in the central chamber, the plug member rotatable between an open position, to facilitate fluid flow through the plug valve, and a closed position, to block fluid flow through the plug valve, the plug valve comprising:
at least one side segment having a topmost surface, a bottommost surface, a first end and a second end, the at least one side segment having a length between the first end and the second end, the length extending less than halfway around a perimeter of the plug member, the at least one side segment having extensions extending from an inner face of the at least one side segment from the topmost surface to the bottommost surface to interlock within corresponding recesses on an outer face of the inlet and outlet seal segments.

* * * * *